Aug. 27, 1940.  T. L. FAWICK  2,213,000
DRIVING ASSEMBLY
Filed Aug. 11, 1937  4 Sheets-Sheet 2

INVENTOR
Thomas L. Fawick
BY Willard D. Eakin
ATTORNEY

Aug. 27, 1940.  T. L. FAWICK  2,213,000
DRIVING ASSEMBLY
Filed Aug. 11, 1937  4 Sheets-Sheet 3
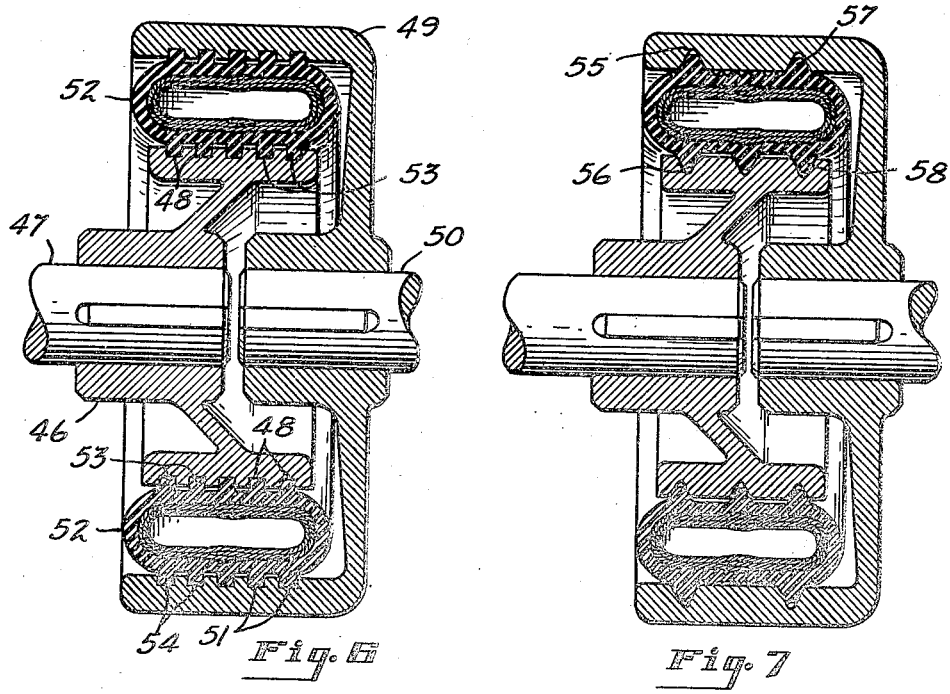
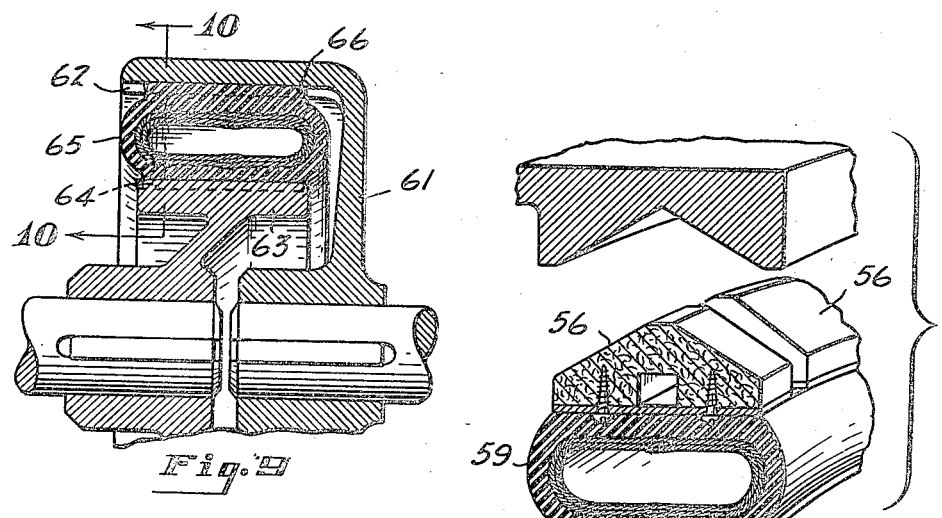
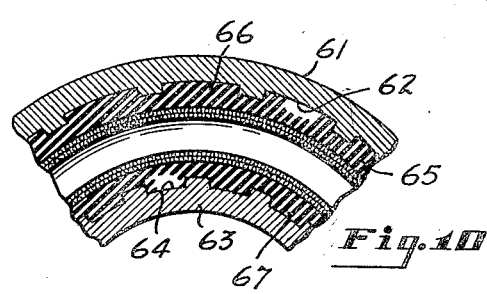
INVENTOR
Thomas L. Fawick
BY Willard D. Eakin
ATTORNEY

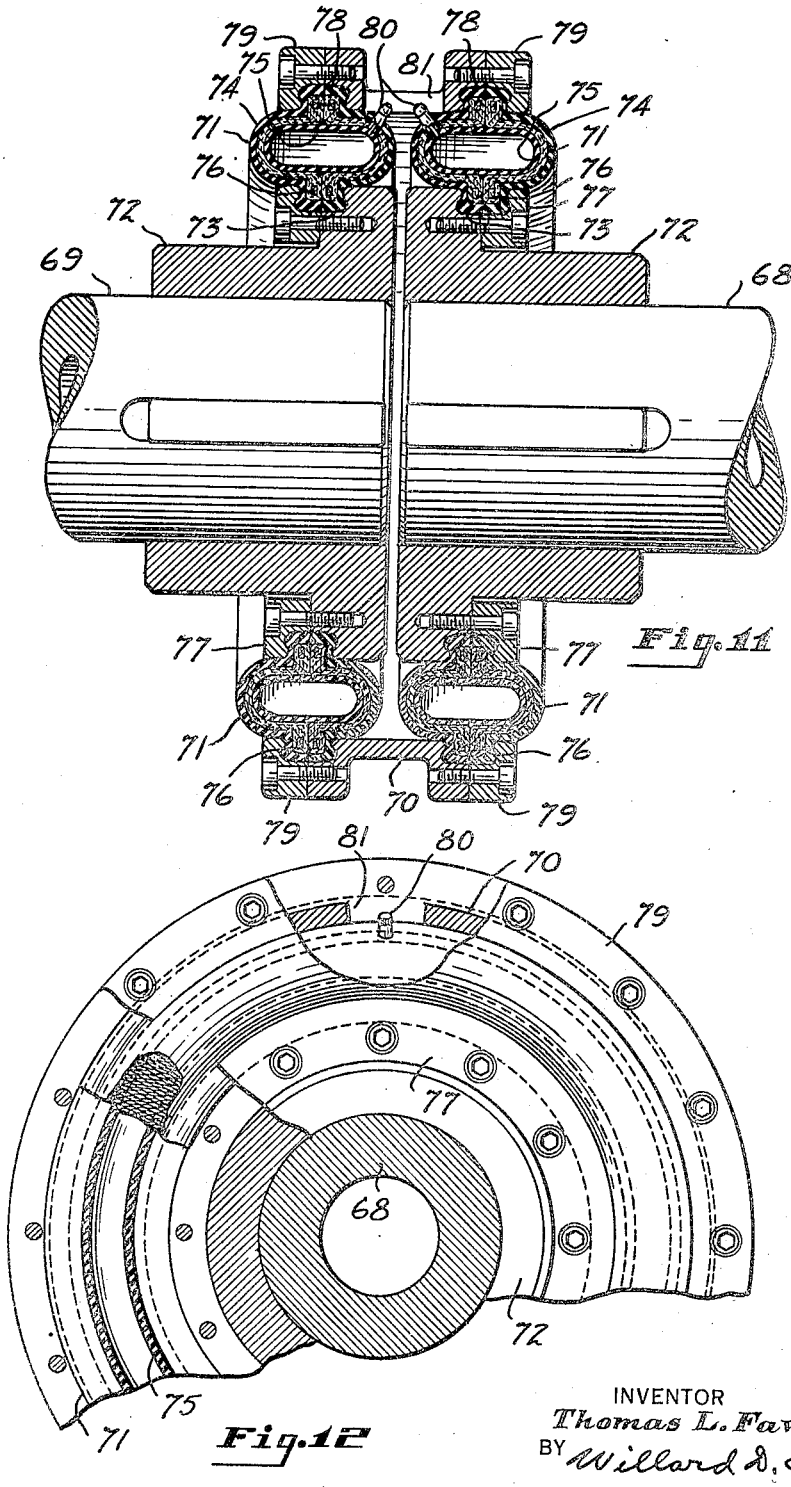

Patented Aug. 27, 1940

2,213,000

UNITED STATES PATENT OFFICE 2,213,000

DRIVING ASSEMBLY

Thomas L. Fawick, Akron, Ohio, assignor to The Fawick General Company, Inc., Akron, Ohio, a corporation of Indiana Application August 11, 1937, Serial No. 158,591

12 Claims. (Cl. 192—88)

This invention relates to driving assemblies and particularly to a flexible transmission element providing a driving connection between rotatable driving and driven members or the like.

An object of the present invention is to provide an elastic and yieldable torque transmitting member which is self-adjusting and which does not require close alignment of the driving and driven members, the torque transmitting member maintaining an effective driving connection and effectively absorbing thrusts due to angular misalignment of the shafts or lateral or longitudinal movements of the shafts during operation.

A further object of the invention is to provide a driving assembly with a yieldable, elastic, slip-resistant torque transmitting element which maintains a strong friction grip between the driving and driven elements.

A further object is to provide an inflatable torque transmitting element which can be quickly and easily distended into engagement with the cooperating driving element or collapsed to free the driven member from the driving member.

A further object is to provide an inflatable friction band of a form such that it occupies a minimum amount of space when deflated so that it may be mounted in a narrow annular space between the driving and driven elements.

A further object is to provide an inflatable torque transmitting element construction providing adequate strength, with a high degree of yieldability.

This application discloses subject matter which is described and claimed in my United States Patent No. 2,111,422, granted March 15, 1938, and my copending applications Serial No. 99,421, filed September 4, 1936; Serial No. 101,638, filed September 19, 1936; Serial No. 131,656, filed March 18, 1937; and Serial No. 158,592, filed concurrently herewith.

Reference should be had to the accompanying drawings forming a part of this specification, in which:

Figs. 5 to 10 are sectional views showing modified forms of torque transmitting members;

Fig. 11 is an axial section showing a further modification of the invention; and Fig. 12 is a fragmentary side elevation of the driving connection shown in Fig. 11.

Figure 1:
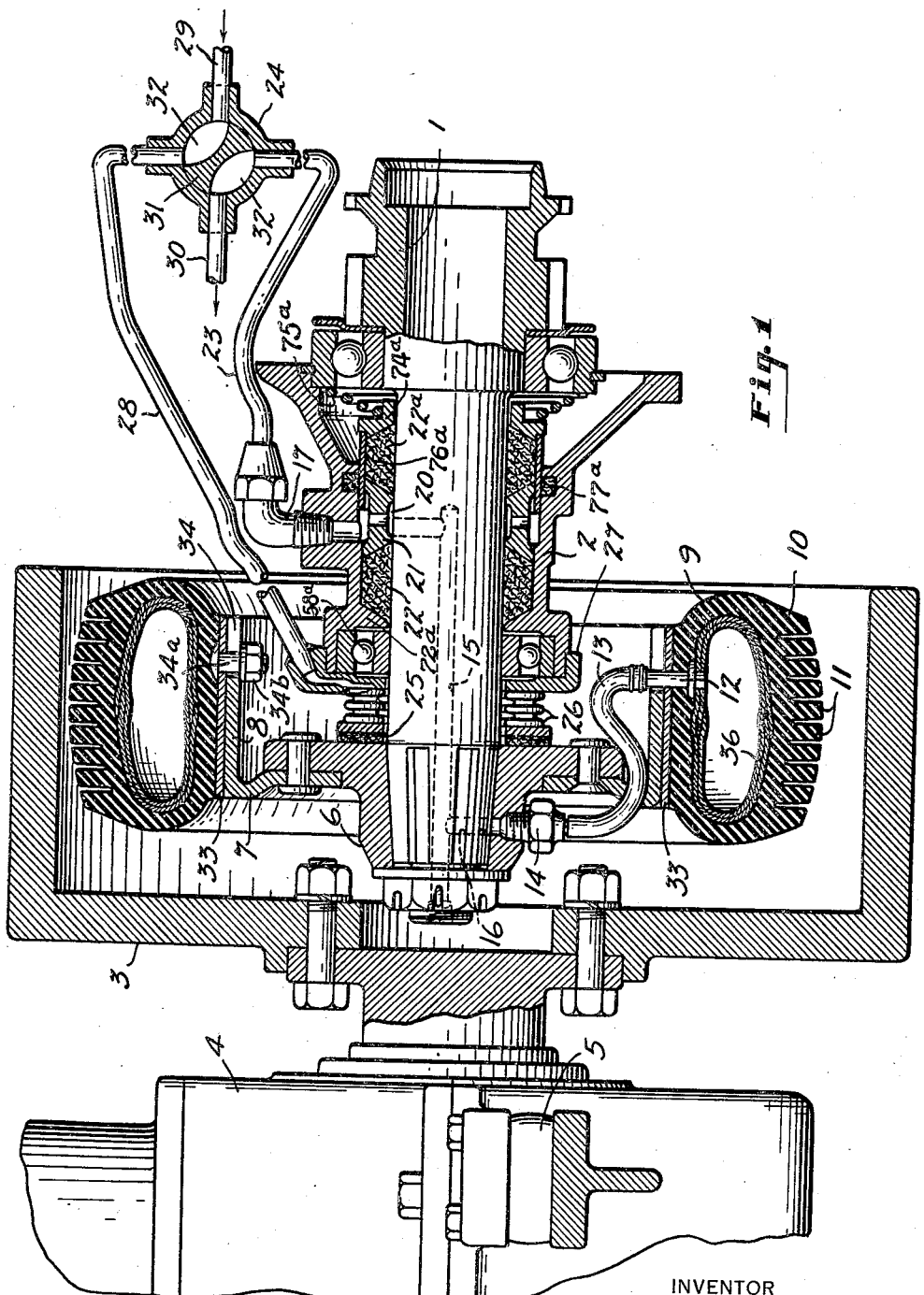
Figure 1 is a longitudinal section of an assembly embodying the invention.
Figure 2:
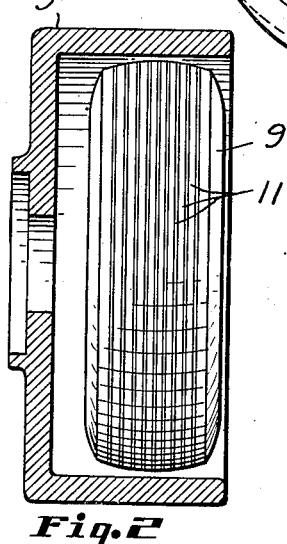
Fig. 2 is a fragmentary section showing a similar assembly in which the driving and driven elements are concentric.

In Fig. 1 of the drawings a driven shaft 1 is shown mounted in a transmission-case extension or bracket 2, the shaft 1 being driven through a drum 3 which may be in the form of a flywheel attached to the shaft of an internal combustion engine 4. The engine 4 may be mounted on cushion supports 5. Shaft 1 has a hub 6 attached to the end thereof which carries a disk 7 provided with a peripheral rim portion 8 which carries an inflatable annulus 9 which is constructed like a pneumatic tire. The annulus 9 is vulcanized to a transversely elongated cross-sectional form so that when uninflated the width of the annulus is considerably more than its radial depth. The annulus 9 has a thickened tread portion 10 the peripheral face of which is made elastic and yieldable by means of closely spaced narrow and flexible circumferential ribs 11 which have a height considerably in excess of their thickness and which will readily flex laterally when subjected to radial and circumferential thrusts by engagement with the internal cylindrical surface of the driving member 3. The driving and driven members may be offset laterally as shown in Fig. 1 or may be coaxial as shown in Fig. 2. When the driven shaft is offset with respect to the driving shaft the yieldable tread annulus 9 provides an effective frictional engagement with the driving member 3 throughout a substantial arc of contact. When the driving and driven shafts are concentric, as shown in Fig. 2, the contact is continuous throughout the periphery of the annulus 9 and the flexible ribs 11 provide an effective slip resisting friction surface which is elastic and yieldable. The yieldability of the tread surface of the annulus, together with the flexibility of the side walls of the annulus provide an elastic and yieldable driving connection capable of absorbing shocks due to relative movement of the driving and driven shafts during operation. If there is a slight angular misalignment of the driving and driven shafts the side walls and tread portions of the annulus 9 will readily yield and absorb the thrusts which would otherwise be transmitted to the bearings of the shafts. The yieldable annulus also effectually absorbs shocks due to slight relative lateral or longitudinal movements of the shafts during operation. For example, the engine 4 may vibrate on its cushion supports during operation without damage to any of the rigid elements carried by the driven shaft 1, the shocks due to such movements of the driven shaft being absorbed by the elastic tread and flexible side walls of the inflatable annulus 9. The tread 10 is preferably molded to a convex form so that upon inflation of the annulus the engagement of the tread portion of the annulus with the internal cylindrical surface of the driving member 3 will be gradual, the initial contact being at a single point centrally of the tread and the area of contact greatly increasing laterally and circumferentially as the annulus is inflated. The gradual engagement of the annulus with the driving drum is desirable since it permits slip at the beginning of the engagement and avoids a sudden grabbing.

In this embodiment provision is made for conducting pressure fluid to and from the bag through the flexible tube 13 and the channel 15 formed in the shaft 1 by slidably mounting in the bracket 2 a distributor ring 21 shaped with a channel 20 to be in communication with the channel 15 of the shaft and with a connecting pipe 23 while at any of a substantial range of positions lengthwise of the shaft.

A packing 22 is mounted between a tapered side face of the distributor ring 21 and a tapered internal flange 72a of the bracket 2 adjacent a bearing 58a and a packing 22a is mounted between the tapered opposite face of the distributor ring and a tapered pack ring 74a slidably mounted on the shaft and urged against the adjacent packing by an axial-thrust spring 75a seated against the outer race of an adjacent shaft bearing.

The packing 22 is confined on its outer face by the inner face of a part of the bracket 2 and the packing 22a is confined on its outer face by a sleeve 76a seated against a shoulder formed on the pack ring 74a, the sleeve being slidably fitted between one margin of the distributor ring and a cylindrical inner face of the bracket 2. The packing 22 is adapted to seal against the escape or ingress of fluid past its outer face as well as its inner face; the packing 22a is adapted to seal against the escape or ingress of fluid past its inner face and also to seal against the escape or ingress of fluid between it and the sleeve 76a, and a sealing ring 77a is set in a groove in the inner face of the bracket 2 to prevent escape or ingress of fluid between that face and the outer face of the sleeve 76a. In order to quickly stop the driven shaft upon disengagement of the driving connection it is advantageous to provide a brake which is brought into engagement upon release of the annulus 9 from the driving member 3. As shown in Fig. 1 a brake disk 25 surrounding the shaft is mounted for axial movement into and out of engagement with the disk 7. The brake disk 25 is slidable on the shaft 1 and is attached to the forward end of concentric annular diaphragms 26 which are attached at their rear ends to a disk 27 fixed to the bracket 2. The diaphragms 26 and disks 25 and 27 form an annular expansible air chamber around the shaft 1 and air is supplied to this chamber through a tube 28 extending from the disk 27 to the control valve 24. When air under pressure is admitted to the interior of the diaphragm 26 the brake disk 25 is pressed against the disk 7 and when air is exhausted from the interior of the diaphragm the disk 25 is held out of engagement with the disk 7. Control valve 24 serves to admit pressure to the axial passage 15 of the shaft 1 and to the interior of the inflatable annulus 9 and at the same time to exhaust air from within the diaphragm 26 so as to release the brake 25 and expand the annulus 9 into driving engagement with the member 3. The control valve 24 also, when moved to a reverse position, exhausts air from the passage 15 of the shaft and from the annulus 9, and simultaneously admits air under pressure into the space within the diaphragm 26 to apply the brake 25. The valve 24 is a rotary valve and the tubes 23 and 28 are connected to the valve at diametrically opposite points. Intermediate the points of connection of the tubes 23 and 28 to the valve, the valve is provided with diametrically opposite apertures connected to pressure and suction lines 29 and 30. The valve 24 has a rotary plug 31 with recesses 32 on opposite sides thereof which are adapted to establish communication between the pressure and suction lines 30 and 29 with the tubes 23 and 28. In the position shown in Fig. 1 the tube 13 is connected to the suction line 29 and the tube 28 is connected to the pressure line 30. By turning the plug through a quarter turn the connections are reversed to supply pressure to the inflatable annulus and to draw air from within the diaphragm 26 to release the brake. Control valve 24 provides means for quickly disengaging the driving connection and applying a brake to the driven shaft or for releasing the driven shaft and quickly establishing a driving connection with the driving element.

The inflatable annulus 9 is preferably vulcanized to a metal base 33 which is formed of a metal such as a brass or bronze to which the rubber will strongly adhere upon vulcanization. The annulus 9 is secured upon the rim portion 8 by any suitable means. As shown in Fig. 1 the rim 8 is provided with slots 34 which receive bolts 34a attached to the metal base 33 and the base 33 is detachably secured to the rim by means of nuts 34b. While the annulus 9 is constructed like a pneumatic tire and may be of endless form, the tube, instead of being endless, may be split transversely as shown at 35 in Fig. 3. The adjoining ends of the tube forming the annulus are closed at 35 and the base 33 is also split at this point so that when the nuts 34 are loosened the annulus may be readily expanded and freed from the rim 8. The construction of the annulus 9 corresponds to that of a pneumatic cord tire and is preferably reinforced throughout by a suitable number of layers of parallel cords 36. In the conventional tire construction the reinforcing cords are disposed diagonally. For the purpose of the present invention it is preferred that the cords 36 be disposed radially.

The annulus 9 being of flattened form when in an unstrained condition, and the radial dimension of the space between the base or inner periphery of the annulus and the inner face of the bell member being correspondingly small, so that the tangential forces of the torque at its inner and outer peripheries are not widely offset from each other, the annulus can be adequately reinforced by radial cords, and such reinforcement, while adapted to withstand high fluid pressure within the annulus for a given strength of cords, by reason of the small radius of curvature in the side walls of the annulus, also allows easy transverse shifting or weaving of adjacent parts of the annulus-contacting members, such as occurs in the case of angular misalignment of the shafts, without substantial increase of strain on the cords, and it also allows substantial lateral offsetting of parallel shafts without such resistance and consequent strain as would be present if the cords were oblique, as oblique cords in such a construction act in the manner of tent ropes or hammock ropes in two arcs of the circle to resist such offsetting of the shafts.

Figure 4:
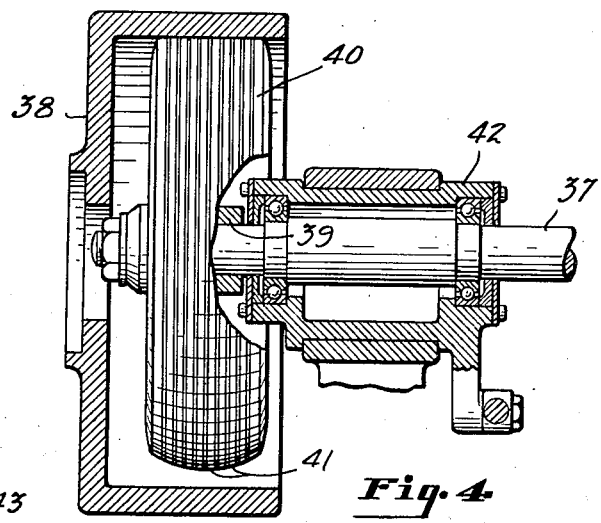
Fig. 4 is a longitudinal section showing a slightly modified assembly in which the inflatable member is mounted in an eccentric bearing so that it may be shifted bodily into engagement with the cooperating transmission element.

As shown in Figs. 1 and 2, the driving connection may be established through the inflatable annulus by distention of the annulus. If desired the driving connection may be made by shifting the driving and driven shafts laterally, one with respect to the other, to bring the annulus into engagement with the interior of the drum. As shown in Fig. 4 a driven shaft 37 is offset laterally with respect to the axis of a driving drum 38. Shaft 37 has a hub 39 attached thereto upon which is mounted an inflatable annulus 40 which may be in the form of a tube vulcanized to an internally round cross-section. The annulus 40 has a flexible rib tread 41 similar to that shown in Fig. 1. The shaft 37 is mounted in an eccentric adjustable bearing 42 which may be rotated to bring the flexible rib tread 41 into engagement with the interior of the drum 38 and to exert sufficient pressure upon the annulus to bring the flexible cushion tread into engagement with the drum through a substantial arc.

Figure 5:
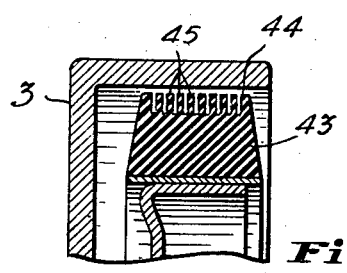

The advantages of the invention may be sufficiently obtained in some cases with an annulus composed of elastic rubber provided with a yieldable elastic drum engaging tread composed of flexible circumferential ribs. As shown in Fig. 5 the torque transmitting annulus consists of a body 43 composed of elastic rubber which is provided with a soft and elastic cushion tread 44 composed of closely spaced narrow flexible ribs 45. The shaft carrying the rubber annulus 43 may be shifted laterally to press the elastic tread 44 into engagement with the driving drum with a pressure sufficient to establish frictional contact through the desired arc.

When the driving and driven shafts are coaxial the engagement between the flexible annulus and the drum is substantially uniform throughout the circumference and the shafts turn at the same speed. When the driving and driven shafts are laterally offset, the circumference of the torque transmitting annulus is slightly less than that of the drum and contacts with the interior of the drum throughout about one-half of the circumference, rolling slowly within the drum during operation. In either case the flexible and elastic torque transmitting member readily yields to permit relative movement between the rigid driving and driven elements and absorbs shocks which would otherwise be transmitted through the rigid elements and shafts to the bearings without substantially affecting the pressure with which the flexible tread is held against the drum throughout the area of contact, thus making it possible to greatly simplify and cheapen the structure of the bearings and transmission elements while maintaining high efficiency.

In Figs. 6 to 10 of the drawings various inflatable torque transmitting members which may be advantageously used in various embodiments of the invention are shown. In Fig. 6 of the drawings a hub member 46 attached to a shaft 47 is provided with a series of parallel circumferential grooves 48. The hub member 46 lies within a drum 49 attached to a shaft 50 coaxially aligned with the shaft 47. The drum 49 is provided with parallel internal circumferential grooves 51. Between the hub member 46 and drum 49 there is mounted an inflatable annulus 52 which is mold vulcanized to a transversely flattened cross-section so that when deflated it can occupy a narrow space between the hub member 46 and drum 49. The annulus 52 has internal ribs 53 fitting in the grooves 48 of the hub member and external ribs 54 fitting in the grooves 51 of the drum 49. When the annulus 52 is deflated the periphery thereof is withdrawn from frictional engagement with the drum 49 and when inflated the external ribs 54 are pressed into the grooves 51 of the drum and continuous frictional engagement is maintained throughout the periphery thereof.

In Fig. 7 of the drawings there is shown a driving connection similar to that shown in Fig. 6 except that the grooves 55 and 56 of the drum and hub are V-shaped grooves and the ribs 57 and 58 of the inflatable annulus are V-shaped ribs. Upon inflation of the annulus the V-shaped ribs having wedging engagement with the V-shaped grooves providing a very effective slip-resisting engagement between the annulus and the drum and between the annulus and the hub member.

In Fig. 8 of the drawings, wherein an outer metal member otherwise corresponding to the member 3 of Fig. 1 is formed with a V-groove in its inner face and wherein the bag or annulus is adapted for the same mounting and the same connections as the bag or annulus 9 of Fig. 1, an inflatable annulus 59 is shown to the periphery of which friction blocks 56 are attached. The blocks 56 may be of suitable wear and heat-resisting material and may be V-shaped in cross-section for engagement with a correspondingly shaped channel in the drum. The V-shaped rib and groove construction of Figs. 7 and 8 is applicable to driving connections between coaxial shafts as shown in Figs. 2 and 6 or to driving connections between laterally offset shafts such as shown in Figs. 1 and 4.

In Figs. 9 and 10 of the drawings there is shown a drum 61 which is provided with angularly spaced internal axial grooves 62 and a hub member 63 within the drum which is provided with axial grooves 64. An inflatable torque transmitting member 65 is interposed between the hub and drum, the inflatable member having external transverse ribs 66 which fit in the axial grooves 62 of the drum and internal transverse ribs 67 which fit in the axial grooves 64 of the hub member. The ribs 66 and 67 are preferably arranged in staggered relation with the internal ribs 67 disposed intermediate the external ribs 66. The lugs form positive driving connections between the annulus and the drum and between the annulus and the hub, but both the ribs and the side walls of the annulus are yieldable to permit slight relative movements of the driving and driven members due to angular misalignment or due to relative lateral movements of the shafts during rotation. The annulus 65 may be contracted sufficiently when air is exhausted therefrom to free the ribs 66 from the grooves 62 of the drum or if desired the hub member 63 may be mounted for axial movement so that the annulus may be withdrawn axially from engagement with the drum.

Figs. 11 and 12 of the drawings show a driving connection between coaxial shafts 68 and 69 through an external ring 70 and two inflatable annuli 71, one interposed between each of the shafts 68 and 69 and the external ring 70. At their adjoining ends the shafts 68 and 69 are each provided with a hub member 72 fixed thereto provided with an external cylindrical seat 73 for an annulus 71. Each annulus 71 consists of an outer casing composed of two identical sections 74 and an inner tube 75. Each section 74 is constructed like a pneumatic tire casing each having reinforced beads 76 corresponding to the beads of a pneumatic tire casing. The beads 76 of the two casing sections forming each annulus 71 abut in a central plane perpendicular to the axis of the shafts along the interior and exterior of the annulus. The radially inner bead 76 of the axially inner section of each annulus is seated upon the seat 73 of a hub member 72 and the beads are clamped together to the hub by means of a retaining ring 77 bolted to the hub. The external ring 70 has internal cylindrical seats 78 which receive the radially outer beads of the axially inner casing sections 74 and the axially outer beads of the annuli are clamped together and to the ring by means of retaining rings 79 bolted to the ring. The inner tube 75 of each annulus 71 is provided with a valve stem 80 which is accessible through a slot 81 in the ring 70 for inflation of the annulus. Upon inflation, the annuli 71 provide a yieldable and elastic driving connection between the shafts 68 and 69.

Figure 3:
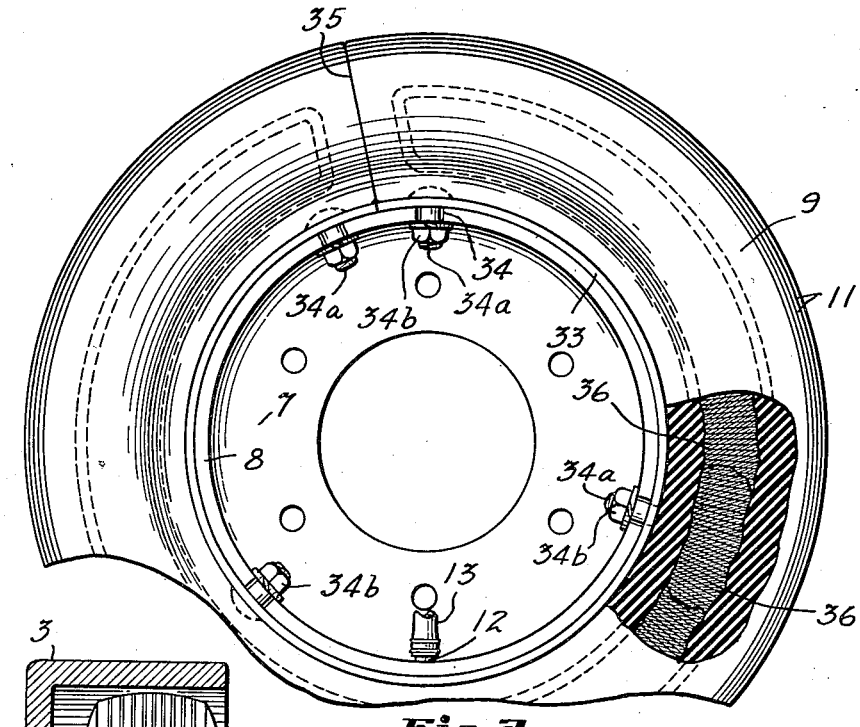
Fig. 3 is a side elevation of the transmission member carrying the inflatable annulus, a portion of the annulus being broken away to show the cord reinforcement.

It is to be understood that the radial cord reinforcement illustrated in Fig. 3 is applicable to the various inflatable annuli herein shown and is the preferred construction and that the inflatable annulus may be of endless construction like the conventional pneumatic tire or may be of arcuate non-endless form as shown in Fig. 3.

In all of the modifications of the invention the flexible elastic annulus maintains a firm driving engagement with the transmission member with which it engages and permits at all times a substantial amount of angular or lateral play between the driving and driven elements rendering unnecessary the expensive bearings, gearing and universal couplings required, ordinarily, at opposite sides of driving connections between power transmission shafts.

An advantage of the construction shown and described is that in an installation in which a sympathetic vibration occurs or is likely to occur it can be stopped or avoided by stiffening or softening the bag by increasing or decreasing the fluid pressure within it and thus changing the natural rate of vibration or harmonics of the assembly.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. An assembly comprising two relatively rotary members, fluid-distensible friction engagement drive means interposed operatively between the two, a fluid actuated brake for one of said members, and means for concurrently applying pressure fluid to the drive means and suction to the brake actuating means and, alternatively, for applying suction to the drive means and pressure fluid to the brake actuating means.

2. The combination of a driving member and a driven member having juxtaposed surfaces at least one of which is formed with a longitudinal groove, and, interposed operatively between them, a hollow fluid containing member formed of flexible material and with a longitudinal rib on at least one of its faces adapted to occupy said groove, the groove and the rib being at least approximately of V-shape, the combination including means for conducting fluid into the container to distend it and means for applying suction to it to retract it.

3. A transmission case having a housing extension, a clutch shaft extending from said case and surrounded by said extension, a clutch mechanism asociated with said shaft and comprising a fluid-distensible clutch-actuating member, alignment bearings for said shaft, said extension supporting a bearing at its outer end to assist in holding said shaft in axial alignment, and packing fixed between the said bearings, the housing extension and the shaft being formed with communicating fluid passages and the fluid passage in the shaft being in communication with the said fluid-distensible member.

4. The combination of a transmission case and a transmission clutch shaft extending therefrom, a clutch mechanism associated with said shaft and comprising a fluid-distensible clutch-actuating member, said case including a housing surrounding the said shaft and the housing and the shaft being formed with communicating fluid passages, and packing means sealing the housing to the shaft, the passage in the shaft being in communication with the said fluid-distensible member.

5. The combination of a motor vehicle transmission case and a transmission clutch shaft extending therefrom, a clutch mechanism associated with said shaft and comprising a fluid-distensible clutch-actuating member, said case including a housing surrounding the said shaft and the housing constituting a bearing support for the shaft, the housing and the shaft being formed with communicating fluid passages, and packing means sealing the housing to the shaft, and means for maintaining a follow-up pressure on the packing means, the passage in the shaft being in communication with the said fluid-distensible member.

6. The combination of a motor vehicle transmission case and a transmission clutch shaft extending therefrom, a clutch mechanism associated with said shaft and comprising a fluid-distensible clutch actuating member, said case including a housing surrounding the said shaft and the housing constituting a bearing support for the shaft, the housing and the shaft being formed with communicating fluid passages, packings on opposite sides of said passages, an apertured packing-spacer ring between the packings and slidably mounted on the shaft, and means for maintaining a follow-up pressure on the packings and spacer ring, the passage in the shaft being in communication with the said fluid-distensible member.

7. The combination of a motor vehicle transmission case and a transmission clutch shaft extending therefrom, a clutch mechanism associated with said shaft and comprising a fluid-distensible clutch-actuating member, said case including a housing surrounding the said shaft and the housing constituting a bearing support for the shaft, the housing and the shaft being formed with communicating fluid passages, packings on opposite sides of said passages, an apertured packing-spacer ring between the packings and slidably mounted on the shaft, and means for maintaining a follow-up pressure on the packings and spacer ring, the last said means comprising a retaining sleeve surrounding one of the packings and slidable within and sealed to the housing, the passage in the shaft being in communication with the said fluid-distensible member.

8. The combination of a transmission case and a clutch shaft extending therefrom, a clutch mechanism associated with said shaft and comprising a fluid-distensible clutch-actuating member, said case including a housing surrounding the said shaft and the housing and the shaft being formed with communicating fluid passages, a fluid-actuated brake mounted at least substantially between the said housing and the said clutch mechanism, and means for applying pressure fluid to the fluid-distensible clutch-actuating member through said passages and venting fluid from the brake-actuating means concurrently and, alternatively, for venting fluid from the clutch-actuating member through said passages and applying pressure fluid to the brake-actuating means concurrently.

9. The combination of a pair of shafts, a driving member and a driven member mounted upon them respectively, and formed with juxtaposed surfaces, a fluid-containing bag mounted between said surfaces, said bag being provided with a wedging surface for engagement with the surface of one of said members for transmitting the entire torque by friction, and means for conducting pressure fluid into the bag and for venting fluid from the bag, during rotation of the bag.

10. An assembly comprising driving and driven rotary structures adapted for frictional engagement with each other, the driven structure comprising an annular, flexible, torque-transmitting fluid container coaxial with and distensible radially of the assembly for effecting such engagement, said container defining a fluid-receiving space that is of greater dimension axially than radially of the assembly, a fluid-actuated, axially-applied brake for the driven structure, said brake comprising a fluid container surrounding the axis of rotation, and means for applying pressure fluid to the first said container and venting fluid from the brake-actuating means concurrently and, alternatively, for venting fluid from the first said container and applying pressure fluid to the brake-actuating means concurrently.

11. The combination of two relatively rotary members adapted for wedging frictional engagement with each other, an annular, flexible, torque-transmitting fluid container distensible radially of the assembly for forcing them into wedging frictional engagement, said container being coaxial with said members and defining a fluid-receiving space that is of greater dimension axially than radially of the assembly, and means for charging and venting said container while at least one of said members is rotating, for effecting engagement and disengagement of the said members.

12. An assembly comprising driving and driven rotary structures adapted for frictional engagement with each other, the driven structure comprising an annular, flexible, torque-transmitting fluid container coaxial with and distensible radially of the assembly for effecting such engagement, said container defining a fluid-receiving space that is of greater dimension axially than radially of the assembly, a fluid-actuated, axially-applied brake for the driven structure, said brake comprising a bellows-shaped, torque-resisting, metal fluid container having its axis parallel to the axis of rotation, and means for applying pressure fluid to the first said container and venting fluid from the brake-actuating means concurrently and, alternatively, for venting fluid from the first said container and applying pressure fluid to the brake-actuating means concurrently.

THOMAS L. FAWICK.